US006993010B1

(12) United States Patent
Peshkin

(10) Patent No.: US 6,993,010 B1
(45) Date of Patent: Jan. 31, 2006

(54) SPOOFING TO PRESERVE A COMMUNICATION LINK

(75) Inventor: Joel D. Peshkin, Irvine, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1404 days.

(21) Appl. No.: 09/611,923

(22) Filed: Jul. 7, 2000

(51) Int. Cl.
H04L 12/66 (2006.01)

(52) U.S. Cl. .................. 370/352; 370/517; 370/516; 379/215.01; 379/93.35

(58) Field of Classification Search ............. 370/352, 370/401, 469, 517, 516; 379/93.35, 93.31, 379/215.01; 375/222
See application file for complete search history.

(56) References Cited

U.S. PATENT DOCUMENTS

| 5,519,767 | A  | * | 5/1996 | O'Horo et al. ............. 379/67.1 |
| 5,550,908 | A  | * | 8/1996 | Cai et al. ................ 379/215.01 |
| 6,504,838 | B1 | * | 1/2003 | Kwan ......................... 370/352 |
| 6,580,793 | B1 | * | 6/2003 | Dunn et al. ............. 379/406.04 |
| 6,714,646 | B1 | * | 3/2004 | Gnosspelius et al. .. 379/406.01 |
| 6,731,726 | B1 | * | 5/2004 | Kerner et al. ............. 379/93.35 |
| 6,754,342 | B1 | * | 6/2004 | Surazski et al. ............. 379/421 |
| 6,765,901 | B1 | * | 7/2004 | Johnson et al. ............. 370/352 |
| 6,785,371 | B1 | * | 8/2004 | Olafsson .................. 379/93.35 |
| 6,842,803 | B2 | * | 1/2005 | Schmidt et al. ................ 710/69 |
| 6,912,276 | B1 | * | 6/2005 | Olafsson et al. ......... 379/93.35 |
| 6,925,174 | B2 | * | 8/2005 | LeBlanc ................. 379/406.01 |
| 2004/0174967 | A1 | * | 9/2004 | Liang et al. ............. 379/93.35 |

* cited by examiner

Primary Examiner—Wellington Chin
Assistant Examiner—Chuong Ho
(74) Attorney, Agent, or Firm—Farjami & Farjami LLP

(57) ABSTRACT

A local communication layer is placed in communication with a remote communication layer via a communication link established between a local modem and a remote modem. The communication layers may, for instance, be PPP layers. The communication is then interrupted, for example, by being temporarily paused or being placed on hold. In one scenario, the communication is placed on hold by the remote modem, as a result of a call-waiting alert received by the remote modem. After the communication has been placed on hold, the local modem monitors PPP frames from the local PPP layer and spoofs the local PPP layer by way of responses to the local PPP layer requests as if such responses were made by the remote PPP layer.

26 Claims, 8 Drawing Sheets

SPOOFING TO PRESERVE A COMMUNICATION LINK

BACKGROUND OF THE INVENTION

1. Field of the Invention

The present invention relates generally to communication systems. More particularly, the present invention relates to preserving a communication link.

2. Background

The widespread use of the Internet as a daily research, entertainment, and communication tool has increased the deployment of modems and other communication devices. There are instances during a communication session where a user may wish to place the communication on hold or cease the data communications, but yet preserve the communication session in order to proceed with data communications after the hold is removed. As discussed in the above-incorporated patent applications, one such instance may arise when a communication session is interrupted by a call waiting alert signal. As a result, the communication device receiving the call waiting alert signal may request that the remote communication device be placed on hold while answering the call waiting.

While such request advises the remote communication device of the hold situation, a higher-level data protocol would remain unaware of the data communication hold situation. Therefore, such higher-level data protocol would continue to transfer data and would eventually time out due to receiving no response from its remote counterpart.

For example, one such higher-level protocol that has gained popularity in the recent years is called Point-to-Point Protocol or PPP. PPP is a data link protocol that provides dial-up access over serial lines. PPP can run on any full-duplex link from POTS (Plain Old Telephone Service) to ISDN (Integrated Services Digital Network) to high-speed lines (T1, T3, etc.). PPP has become popular for Internet access as well as a method for carrying higher level protocols. PPP is a version of the Internet software that may run over telephone lines using high-speed modems. Furthermore, PPP allows a connection to the Internet without using an Internet service provider or an access point to the Internet. PPP may also be used for connecting a home computer to a larger local network, which is connected to the Internet.

In short, PPP provides a method for transmitting data over serial point-to-point links. PPP contains three main components: a method of using High-Level Data Link Control ("HDLC") for encapsulating and transmitting data over serial links, an extensible Link Control Protocol ("LCP") for establishing, configuring and testing the serial links and a family of Network Control Protocols ("NCP") for establishing and configuring different network-layer protocols.

One class of LCP packets used for link management and maintenance includes echo-request to aid PPP for serial link quality determination, performance testing and for numerous other functions. In response to an LCP echo-request, a PPP layer must respond by transmitting an LCP echo-reply, otherwise the remote PPP layer may terminate the communication session. It should therefore be clear that in situations where the communication session is placed on hold, such as modem on hold, the PPP layer may terminate the communication session as a result of failing to receive an LCP echo-reply.

Accordingly, there is an intense need in the art for a communication device that is capable of preserving the communication session while the communication session has been placed on hold or is temporarily unable to proceed with data communications.

SUMMARY OF THE INVENTION

In accordance with the purpose of the present invention as broadly described herein, there is provided a spoofing method and system in a communication environment.

According to one aspect of the present invention, a local communication layer is in communication with a remote communication layer via a communication link established between a local modem and a remote modem. In one aspect, the communication layers may be PPP layers. The communication is interrupted, for example, by being temporarily paused or being placed on hold. In one aspect, the communication is placed on hold by the remote modem, as a result of a call-waiting alert received by the remote modem. After the communication has been placed on hold, the local modem monitors PPP frames from the local PPP layer and spoofs the local PPP layer by way of responses to the local PPP layer requests as if such responses were made by the remote PPP layer.

In another aspect, the local modem may monitor the PPP frames to the local PPP layer and acquire information from the PPP frames, such as the remote PPP layer's magic number. The local modem may then include such information in the responses to the local PPP layer requests.

In yet another aspect, the local PPP layer's request may be by way transmitting an Echo-Request packet. The local modem monitoring such request would then respond to such request by transmitting an Echo-Reply packet to the local PPP layer as if the response were made by the remote PPP layer. In one aspect, the local modem includes the remote PPP layer's magic number in the Echo-Reply packet or includes zero, if the remote PPP layer had not previously transmitted its magic number.

In another aspect, a communication system of the present invention includes a controller, a first communication interface, a second communication interface and a spoofing module. The spoofing module monitors the first communication interface and causes a signal to be transmitted through the first communication interface. In one aspect, the signal includes information gathered by the spoofing module while monitoring the first communication interface and, in particular, monitoring information transmitted by the first communication interface.

In one aspect, the first communication interface is in communication with a PPP layer. The first communication interface includes a transmitter and a receiver and the spoofing module monitors the transmitter to acquire a magic number. The spoofing module also monitors the receiver for an Echo-Request, and transmits an Echo-Reply, including the magic number, to the PPP layer.

These and other aspects of the present invention will become apparent with further reference to the drawings and specification, which follow.

BRIEF DESCRIPTION OF THE DRAWINGS

The features and advantages of the present invention will become more readily apparent to those ordinarily skilled in the art after reviewing the following detailed description and accompanying drawings, wherein:

FIG. 2b illustrates various fields of an LCP packet of the PPP frame of FIG. 2a;

FIG. 2c illustrates various fields of an LCP Configure-Request packet of the PPP frame of FIG. 2a;

FIG. 2d illustrates various fields of an LCP Configure-Ack packet of the PPP frame of FIG. 2a;

FIG. 2e illustrates various fields of an LCP Configuration Option of the PPP frame of FIG. 2a;

FIG. 2g illustrates various fields of an LCP Echo-Request packet of the PPP frame of FIG. 2a;

FIG. 2h illustrates various fields of an LCP Echo-Reply packet of the PPP frame of FIG. 2a;

DETAILED DESCRIPTION OF THE INVENTION

The present invention may be described herein in terms of functional block components and various processing steps. It should be appreciated that such functional blocks may be realized by any number of hardware and/or software components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in any number of data communication contexts and that the modem system and/or the higher-level protocol described herein is merely one illustrative application for the invention. Further, it should be noted that the present invention may employ any number of conventional techniques for data transmission, signaling, signal processing and conditioning, and the like. Such general techniques that may be known to those skilled in the art are not described in detail herein.

It should be appreciated that the particular implementations shown and described herein are merely exemplary and are not intended to limit the scope of the present invention in any way. Indeed, for the sake of brevity, conventional encoding and decoding, frame reception/transmission or processing, tone detection or transmission, training, and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 1:
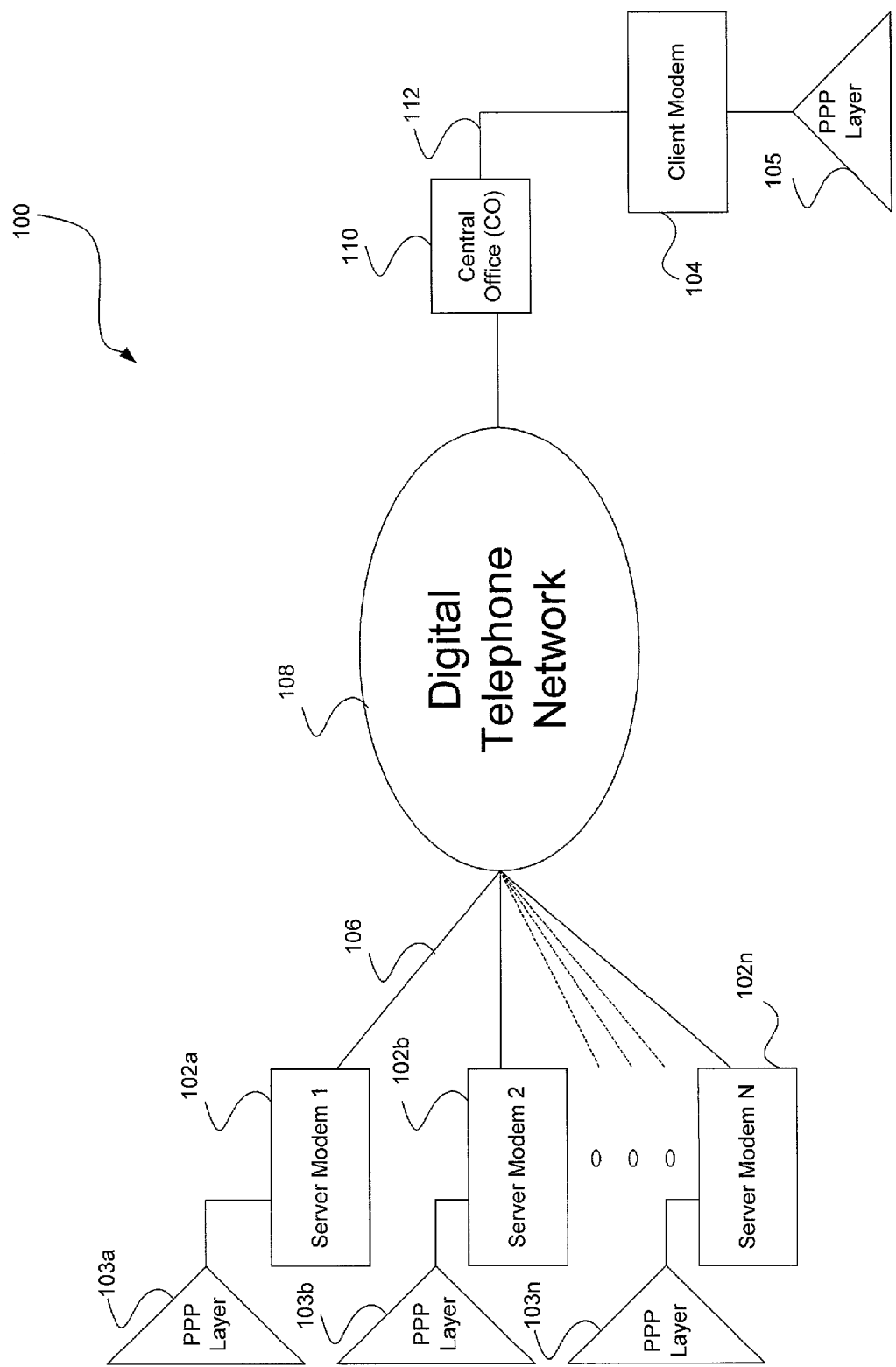
FIG. 1 is a block diagram depicting a general modem system environment capable of supporting PPP connections.

Turning to the drawings, FIG. 1 illustrates a block diagram depicting a general modem system 100 in which the techniques of the present invention may be practiced. Modem system 100 may be capable of supporting connections associated with a higher-level protocol, such as PPP. PPP is designed for simple links, which transport packets between two peers. These links provide full-duplex simultaneous bi-directional operation and deliver packets in order.

The modem system 100 includes a plurality of server modems (identified by reference numbers 102a, 102b, and 102n) and a client modem 104. Server modems 102 may each be associated with an Internet service provider or any suitable data source. As shown in FIG. 1, server modems 102a, 102b, and 102n are associated with PPP layers 103a, 103b and 103n, respectively. Client modem 104 may be associated with a suitable data source, e.g., a personal computer capable of running a PPP layer 105. For purposes of this description, PPP layer 105 may run on an operating system such as MICROSOFT WINDOWS. As stated above, PPP layer is a version of the Internet software that may be used for connecting into and as an access point to the Internet. Although not shown in FIG. 1, client modem 104 may be integrated with the personal computer.

In the context of this description, modem system 100 may employ 56 kbps modem devices that are compatible with the V.92 Recommendation, the V.90 Recommendation, legacy 56 kbps protocols, the V.34 Recommendation, or the like. Such modem devices are suitable for use in modem system 100 where a given server modem 102 utilizes a digital connection 106 to the digital telephone network 108. The client modem 104 is connected to a local central office 110 via an analog local loop 112. Thus, the communication channel established between client modem 104 and any server modem 102 is digital up to the central office 110. Thereafter, the digital signals are converted to an analog signal for transmission over the local loop 112.

If an end user desires to establish an Internet connection, a host software (not shown) may perform any number of operations in response to a user command. For example, the host software may prompt client modem 104 to dial the telephone number associated with server modem 102a (which, for this example, is the server modem associated with the user's Internet service provider). Server modem 102a and client modem 104 perform a handshaking routine that initializes the modem parameters associated with the current communication channel.

Once the handshaking routine is performed successfully and carrier detection or network administrator configuration indicates that the physical-layer is ready to be used, PPP will proceed to a link establishment phase. To establish communication over a PPP, the originating PPP layer 105 first sends LCP frames to configure and optionally test the data-link. After the link has been established and optional facilities have been negotiated as needed by the LCP, the originating PPP layer 105 sends NCP frames to choose and configure one or more network-layer protocols. When each of the chosen network-layer protocols has been configured, packets from each network-layer protocols can be sent over the link. The link will remain configured for communications until explicit LCP or NCP frames close the link, or until some external event, such as a user intervention occurs.

PPP includes three classes of LCP packets: Link Configuration packets used to establish and configure a link, Link Termination packets used to terminate a link and Link Maintenance packets to manage and debug a link. The Link Configuration packets include LCP Configure-Request and Configure-Ack packets. The Link Maintenance packets include LCP Echo-Request and LCP Echo-Reply packets.

PPP is capable of operating across any DTE/DCE (Data Terminal Equipment/Data Circuit Equipment) interface.

PPP requires that a duplex circuit, either dedicated or switched, that can operate in either asynchronous or synchronous mode, transparent to PPP link-layer frames. PPP uses the principles, terminology and frame structure of the International Organization for Standardization HDLC procedure, which are hereby incorporated by reference. PPP may also use an asynchronous HDLC format of the Internet Engineering Task Force ("IETF"), which is hereby incorporated by reference.

Figure 2A:
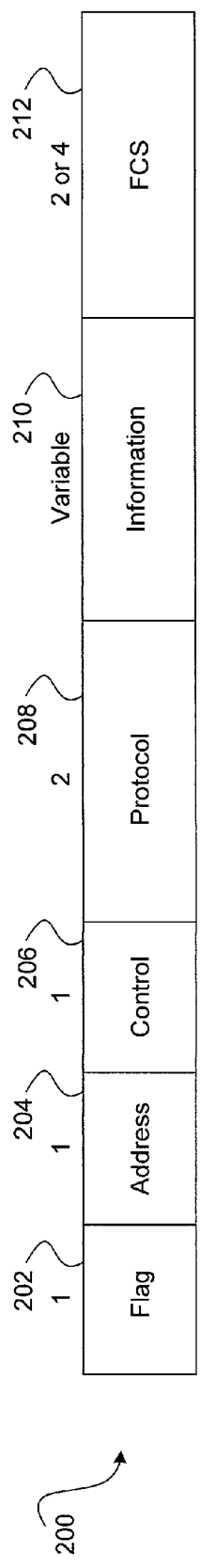
FIG. 2a illustrates various fields of a PPP frame.

Referring to FIG. 2a, a PPP frame 200 is shown. PPP frame 200 includes a single flag byte (octet) 202 that indicates the beginning and/or end of the frame 200. The flag byte 202 consists of the binary sequence "01111110" or the hexadecimal value "7E". PPP frame 200 also includes a single address byte 204 that contains the binary sequence "11111111" or the hexadecimal value "FF", the standard broadcast address. PPP does not assign individual station addresses. As shown in FIG. 2a, PPP frame 200 also includes a single control byte 206 that contains the binary sequence "00000011" or the hexadecimal value "03", which calls for transmission of user data in an unsequenced frame. PPP frame 200 further includes two bytes of protocol field 208 that identify the packet protocol. For example, protocol fields with hexadecimal values in the "8xxx" to "bxxx" range identify NCP packets and in the "cxxx" to "fxxx" range identify LCP packets.

PPP frame 200 also includes zero or more bytes of information field 210 that contain the information for the protocol specified in the protocol field 208. The maximum length of the information field 210 may be 1,500 bytes; however, this value may be negotiated between PPP layers. PPP frame 200 includes a Frame Check Sequence (FCS) that is normally two bytes long for error correction purposes. By prior agreement, however, consenting PPP layers may use a four-byte FCS for improved error correction. The end of the information field 210 is found by locating the closing flag (not shown) and allowing two bytes for the FCS field.

Figure 2B:
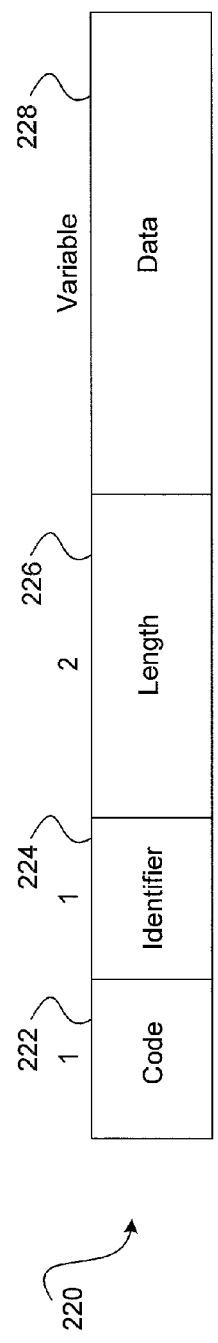

FIG. 2b illustrates various field of an LCP packet 220, which are transmitted from left to right. As shown, the LCP packet 220 includes a single byte code field 222, which identifies the type of the LCP packet 220. The values for the code field 222 of the LCP packet 220 are set forth in an example Table 1 below.

TABLE 1

LCP Packet Code Field

| Code Field Value | Description |
| --- | --- |
| 0 | Configure-Request |
| 1 | Configure-Ack |
| 3 | Configure-Nak |
| 4 | Configure-Reject |
| 5 | Terminate-Request |
| 6 | Terminate-Ack |
| 7 | Code-Reject |
| 8 | Protocol-Reject |
| 9 | Echo-Request |
| 10 | Echo-Reply |
| 11 | Discard-Request |

The LCP packet 220 also includes a single byte identifier field 224, which aids in matching requests and replies. The LCP packet 220 further includes two bytes of length field 226, which indicate the length of the LCP packet 220, including the code field 222, the identifier field 224, the length field 226 and a data field 228, which data field 228 includes zero or more bytes of information.

Figure 2C:
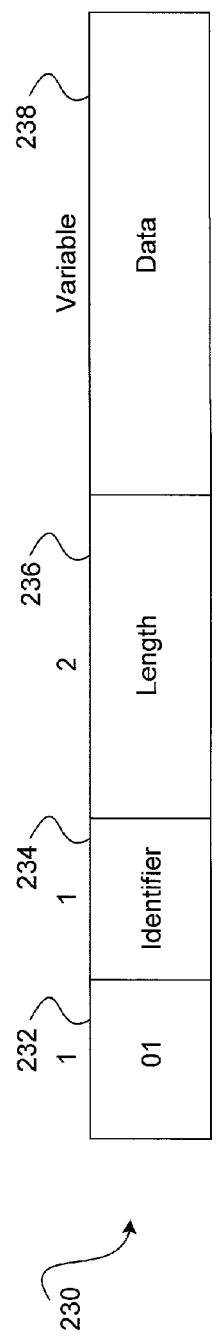

FIG. 2c illustrates various fields of an LCP Configure-Request packet 230, which are transmitted from left to right. Any implementation of PPP layer wishing to open a communication session must transmit the Configure-Request packet 230. As shown in FIG. 2c, the LCP packet 230 includes a single byte code field 232 set to "1", which identifies the LCP packet 230 as a Configure-Request. The LCP packet 230 also includes a single byte identifier field 234, which is changed whenever the contents of options field 238 changes. The LCP packet 230 further includes two bytes of length field 236, which indicate the length of the LCP packet 230, including the code field 232, the identifier field 234, the length field 236 and the options field 238. The options field 238 is a variable length field and contains a list of zero or more configuration options that the sender desires to negotiate. All configuration options are negotiated simultaneously.

Figure 2D:
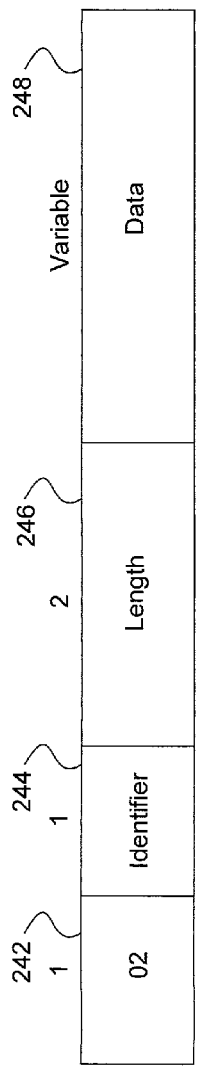

FIG. 2d illustrates various fields of an LCP Configure-Ack packet 240, which are transmitted from left to right. As shown in FIG. 2d, the LCP packet 240 includes a single byte code field 242 set to "2", which identifies the LCP packet 240 as a Configure-Ack. The LCP packet 240 also includes a single byte identifier field 244, which is a copy of the identifier field of the LCP Configure-Request 234 (see FIG. 2c). The LCP packet 240 further includes two bytes of length field 246, which indicate the length of the LCP packet 240, including the code field 242, the identifier field 244, the length field 246 and the options field 248. The options field 248 is a variable length field and contains a list of zero or more configuration options that the sender is acknowledging. All configuration options are acknowledged simultaneously.

Figure 2E:
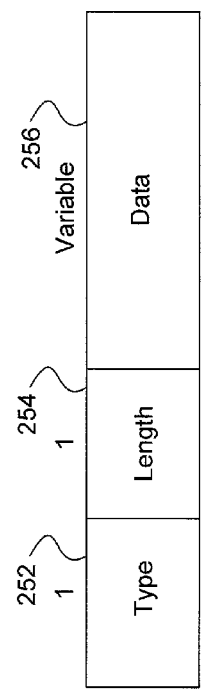

FIG. 2e illustrates various fields of an LCP Configuration Option 250, which are transmitted from left to right. The LCP Configuration Option 250 allows negotiation of modifications to the default characteristics of the PPP layer. If the Configuration Option 250 is not included in the Configure-Request packet 230 (see FIG. 2c), the default value for that Configuration Option is assumed.

As shown in FIG. 2e, the Configuration Option 250 includes a single byte type field 252, which indicates the type of configuration option, as set forth in an example Table 2 below.

TABLE 2

Configuration Options

| Type Value | Description |
| --- | --- |
| 0 | Reserved |
| 1 | Maximum Receive Unit |
| 3 | Authentication Protocol |
| 4 | Quality Protocol |
| 5 | Magic Number |
| 7 | Protocol Field Compression |
| 8 | Address/Control Field Compression |

The Configuration Option 250 also includes a single byte length field 254, which indicates the length of the Configuration Option 250, including the type field 252, the length field 254 and the data field 256. Unless otherwise specified, all Configuration Options apply in a half-duplex fashion, and typically in the receive direction of the link from the point of view of the sender of the LCP Configure-Request packet 230. The Configuration Option 250 also includes a variable length data field 256, which contains information specific to the Configuration Option 250.

Figure 2F:
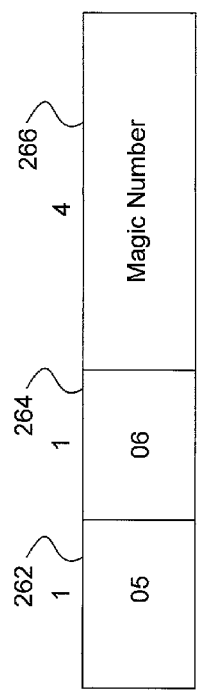
FIG. 2f illustrates various fields of an LCP Configuration Option of FIG. 2e, including a Magic Number Configuration Option.

FIG. 2*f* illustrates various fields of an LCP Configure Option, including a Magic Number Configuration Option 260, which are transmitted from left to right. As shown, the Magic Number Configuration Option 260 includes a single byte type field 262, which is set to "05" to indicate a Magic Number type. The Magic Number Configuration Option 260 further includes a single byte length field 264, which is set to "06" to indicate the length of the Magic Number Configuration Option 260, including the type field 262, the length field 264 and a four-byte long Magic Number field 266.

The Magic Number Configuration Option 260 provides a method to detect looped-back links and other data link layer anomalies. The Magic Number Configuration Option 260 may be required by some Configuration. By default, no Magic Number is negotiated, and zero "0" is inserted where a Magic Number might otherwise be used, such as in LCP Echo-Request and/or LCP Echo-Reply packet. Before the Magic Number Configuration Option 260 is requested, PPP layer must choose a Magic Number. Generally, the Magic Number should be chosen in a random manner in order to guarantee, in all likelihood, that a unique number is selected.

When the LCP Configure-Request 230 is received with a Magic Number Configuration Option 260, the received Magic Number field 266 is compared with the Magic Number field of the last LCP Configure Request sent to the remote PPP layer. If the two Magic Numbers are different, then the link is not looped-back, and the Magic Number should be acknowledged.

Figure 2G:
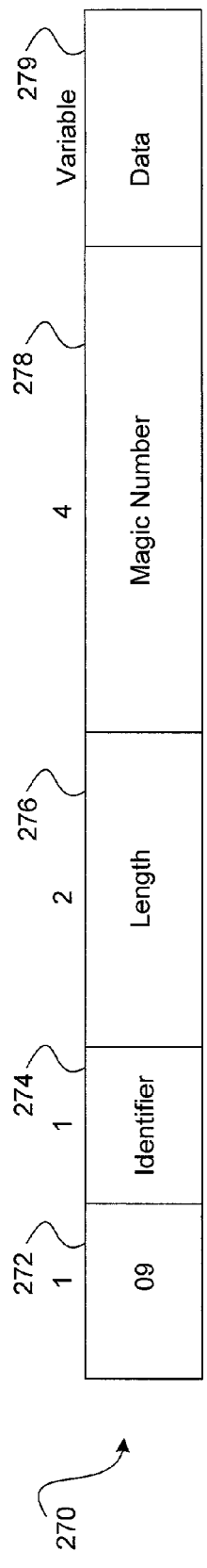
Figure 2H:
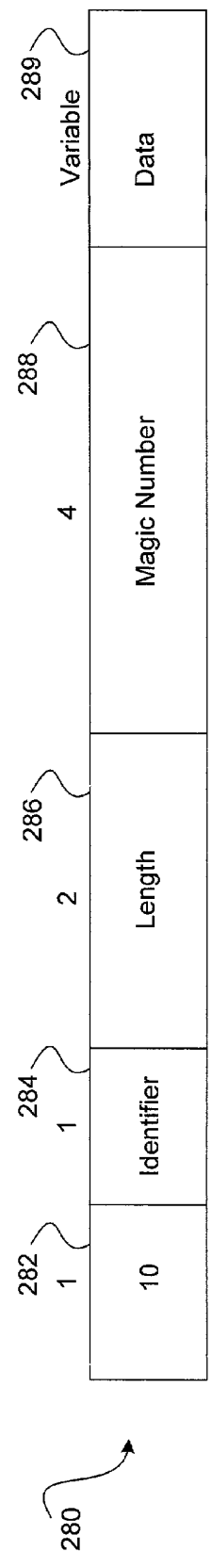

Both LCP Echo-Request and LCP Echo-Reply packets have a Magic Number field (see FIGS. 2*g* and 2*h*.) If a Magic Number has been successfully negotiated, PPP layer must transmit LCP Echo-Request and LCP Echo-Reply packets with the Magic Number field set to the negotiated Magic Number. The Magic Number fields of LCP Echo-Request and LCP Echo-Reply packets are inspected on reception. Therefore, all received Magic Number fields of LCP Echo-Request and LCP Echo-Reply packets must be equal to either zero or the remote PPP layer's unique Magic Number, depending on whether or not PPP layers negotiated a Magic Number.

As stated above, LCP packets include Echo-Request and Echo-Reply packets as link supports for debugging, link quality determination, performance testing, determination as to when a link is functioning properly or is failing, and for numerous other functions.

FIG. 2*g* illustrates various fields of an LCP Echo-Request packet 270, which are transmitted from left to right. As shown, the Echo-Request packet 270 includes a single byte code field 272, which is set to "09" to indicate an Echo-Request packet. The Echo-Request packet 270 also includes a single byte identifier field 274, which is changed whenever the contents of data field 279 changes. The Echo-Request packet 270 further includes two bytes of length field 276, which indicate the length of the Echo-Request packet 270, including the code field 272, the identifier field 274, the length field 276, a magic number field 278 and a data field 279. As stated, the Echo-Request packet 270 also includes four bytes of magic number field 278, as described above. The magic number field 278 must be transmitted as zero "0", until the Configuration Option, as discussed above, has successfully negotiated the Magic Number. The Echo-Request packet 270 also includes data field 279 of zero or more bytes.

FIG. 2*h* illustrates various fields of an LCP Echo-Reply 280 packet, which are transmitted from left to right. Upon reception of the Echo-Request packet 270, the Echo-Reply packet 280 must be transmitted. As shown, the Echo-Reply packet 280 includes a single byte code field 282, which is set to "10" to indicate an Echo-Reply packet. The Echo-Reply packet 280 also includes a single byte identifier field 284, which is a copy of the Echo-Request identifier field 274. The Echo-Reply packet 280 further includes two bytes of length field 286, which indicate the length of the Echo-Reply packet 280, including the code field 282, the identifier field 284, the length field 286, a magic number field 288 and a data field 289. As stated, the Echo-Reply packet 280 also includes four bytes of magic number field 288, as described above. The magic number field 288 must be transmitted as zero "0", until the Configuration Option, as discussed above, has successfully negotiated the Magic Number. The Echo-Reply packet 280 also includes data field 289 of zero or more bytes.

Figure 3:
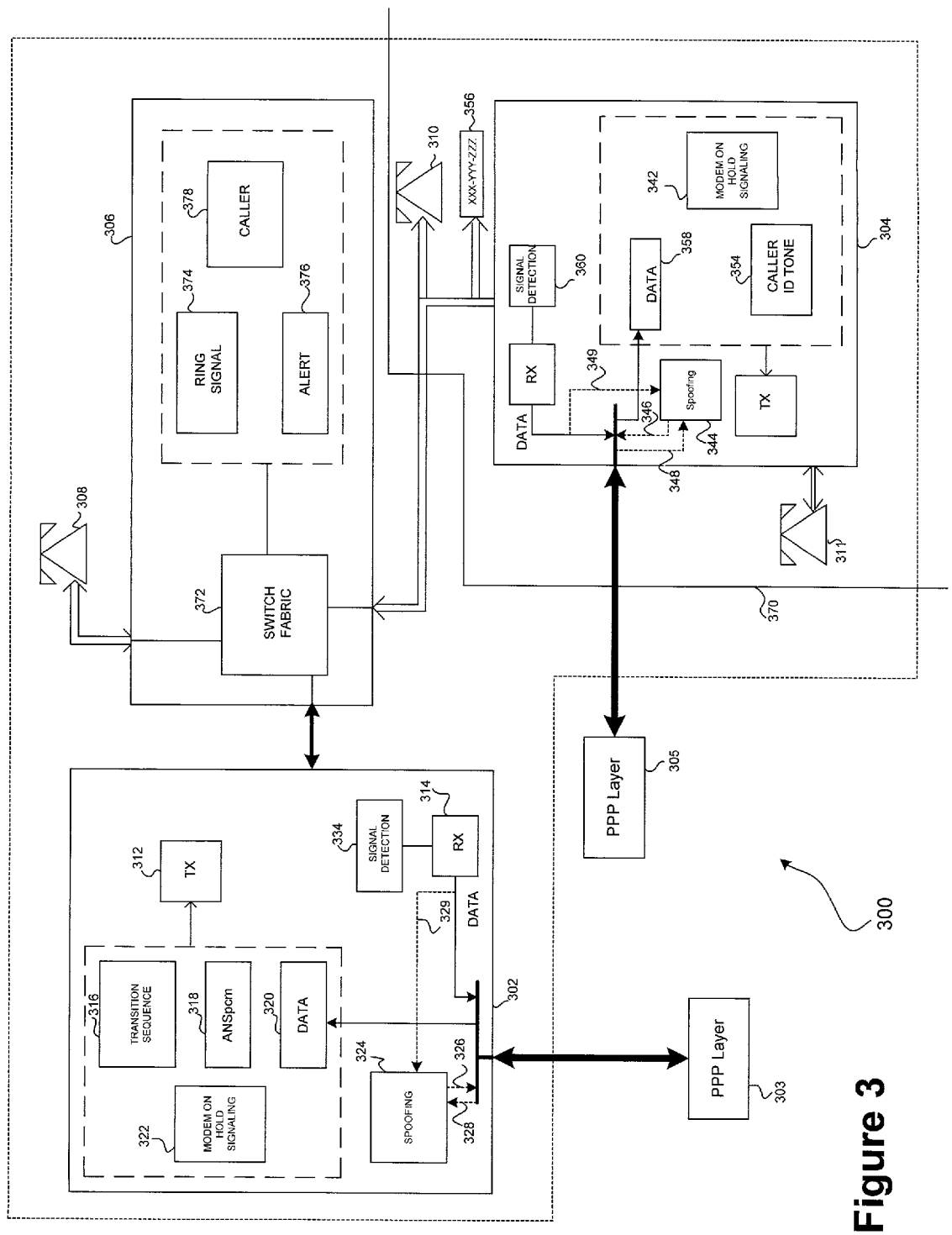
FIG. 3 is a block diagram of a modem system environment in which various aspects of the present invention may be incorporated.

Now, FIG. 3 is a schematic representation of an environment in which a modem system 300 may operate. Modem system 300 generally includes a first modem device 302, which may be associated with a central site, and a second modem device 304, which may be resident at a customer site 370. In the context of a typical V.92 or V.90 system, first modem device 302 may be the DPCM and second modem device 304 may be the APCM. The DPCM modem 302 is coupled to a central office 306 via a digital link and the APCM modem 304 is coupled to central office 306 via an analog link, e.g., the local loop. It should be appreciated that modem system 300 may include additional elements and functionality associated with the quick startup routine, the quick reconnect procedure and/or communication on hold procedures described in the following applications: U.S. application Ser. No. 09/592,707 filed on Jun. 13, 2000, which claims the benefit of U.S. provisional application Ser. No. 60/167,572, filed Nov. 26, 1999, and which is also a Continuation-In-Part of U.S. application Ser. No. 09/557,233, filed Apr. 24, 2000, which is a Continuation-In-Part of U.S. application Ser. Nos. 09/416,482 and 09/393,616, filed Oct. 12, 1999 and Sep. 10, 1999, respectively, which are both Continuation-In-Part applications of U.S. application Ser. No. 09/394,018, filed Sep. 10, 1999, which is a Continuation-In-Part application of U.S. application Ser. No. 09/361,842, filed Jul. 27, 1999, which claims the benefit of U.S. provisional application Ser. No. 60/128,874, filed Apr. 12, 1999. All above-mentioned applications have the same assignee as the present application and are hereby fully incorporated by reference in the present application.

FIG. 3 also depicts a calling device 308 (which is capable of placing an incoming call to the customer site), a parallel answer device 310 located at the customer site, and a series answer device 311 located at the customer site. As shown in FIG. 3, the parallel answer device 310 is connected such that it receives the same calls as the APCM modem 304 in a concurrent manner. In contrast, the series answer device 311 is connected such that the APCM modem 304 routes calls to it. The APCM modem 304 may control or regulate the call traffic to and from series answer device 311 in a conventional manner. A call may be established between the calling device 308 and the answer devices 310 and 311 via the central office 306, and a modem connection may be established between the DPCM modem 302 and the APCM modem 304 via the central office 306.

For the sake of clarity and brevity, FIG. 3 depicts the APCM modem 304 and the DPCM modem 302 in a manner that relates to the example processes described herein. In practical embodiments, each of the modem devices 302 or 304 may be capable of functioning as a transmit or receive modem, and each of the modem devices 302 or 304 may be capable of originating the various signals described herein.

The DPCM modem 302 includes a transmitter section 312 and a receiver section 314, both of which may be configured in accordance with conventional technologies. The DPCM modem 302 is capable of transmitting a number of signals, sequences and tones during various modes of operation. The DPCM modem 302 may be configured to transmit a suitable transition sequence 316 and a characteristic signal point sequence (such as the ANSpcm signal 318) associated with a quick startup routine or a quick reconnect procedure, as described in the above-incorporated related applications. During the data mode, the DPCM modem 302 transmits data 320 in accordance with a suitable data transmission scheme.

The DPCM modem 302 is also capable of transmitting a number of signals that may be received by the APCM modem 304 and/or by the central office 306. For example, modem on hold signalings 322 of the DPCM modem 302 is capable of transmitting an "A" tone and a "B" tone. Of course, the modem devices 302 or 304 may generate and process any suitable tones or signals in lieu of (or in addition to) these predefined tones. The modem on hold signalings 322 is also configured to transmit a number of additional signals associated with the notification of a modem-on-hold, the initiating of a modem-on-hold mode, the reconnection of a modem session after a holding period, and the clearing down of a modem connection, as described in the above-incorporated related applications.

The DPCM modem 302 may also include a signal detection element 334, which may employ any number of known techniques to detect, analyze, and interpret control signals, requests, and tones transmitted by the APCM modem 304 and/or by the central office 306. For example, signal detection element 334 may utilize a conventional tone detector and/or a conventional V.34, V.90 or V.92 differential phase-shift keying (DPSK) receiver configured to detect and distinguish the different signals described herein.

For purposes of the signaling scheme described herein, the APCM modem 304 is preferably configured in a manner similar to the DPCM modem 302. In other words, modem on hold signalings 342 of the APCM modem 304 is capable of transmitting an "A" tone, a "B" tone, a modem hold notification, a modem hold request, a modem hold acknowledgment, a quick reconnect request and a disconnect signal. In addition, the APCM modem 304 may be configured to generate a caller ID tone 354 that informs central office 306 that the customer site supports a caller ID feature (as depicted by the caller ID component 356). Of course, the APCM modem 304 transmits data 358 during the data mode.

As described above in connection with the DPCM modem 302, the APCM modem 304 preferably includes a signaling detection element 360 that enables APCM 304 to receive, detect, and analyze the various signaling tones and sequences transmitted by the DPCM modem 302. In this manner, both the APCM modem 304 and the DPCM modem 302 are capable of receiving the signals and are capable of switching operating modes in response to the particular signal or signals that are received.

The central office 306 is configured in a conventional manner to perform circuit switching associated with modem, voice, and facsimile calls. The central office 306 may support any number of customer sites and the central office 306 may be operatively coupled to any number of other central offices, central site modems, or the like. As described briefly above, the APCM modem 304, answer device 310, and caller ID component 356 may reside at customer site 370.

The central office 306 includes a suitable switching fabric 372 for routing calls between the appropriate parties. For example, the switching fabric 372 may switch to a first state to establish a modem connection between the DPCM modem 302 and the APCM modem 304 and to a second state to establish a voice connection between calling device 308 and answer device 310. Furthermore, switch fabric 372 may be capable of temporarily interrupting a connection to impress control signals, data, or tones onto the current circuit or line. In this respect, central office 306 may transmit a number of ring signals 374, alert signals 376, caller ID data 378, and other information depending upon the particular situation. For example, in accordance with current methodologies, central office 306 may temporarily interrupt a voice call and transmit a call-waiting alert signal 376 to the customer site 370. If the customer accepts the incoming call, then switch fabric 372 may be reconfigured to route the incoming call the customer site 370 while the original call is placed on hold.

Figure 4:
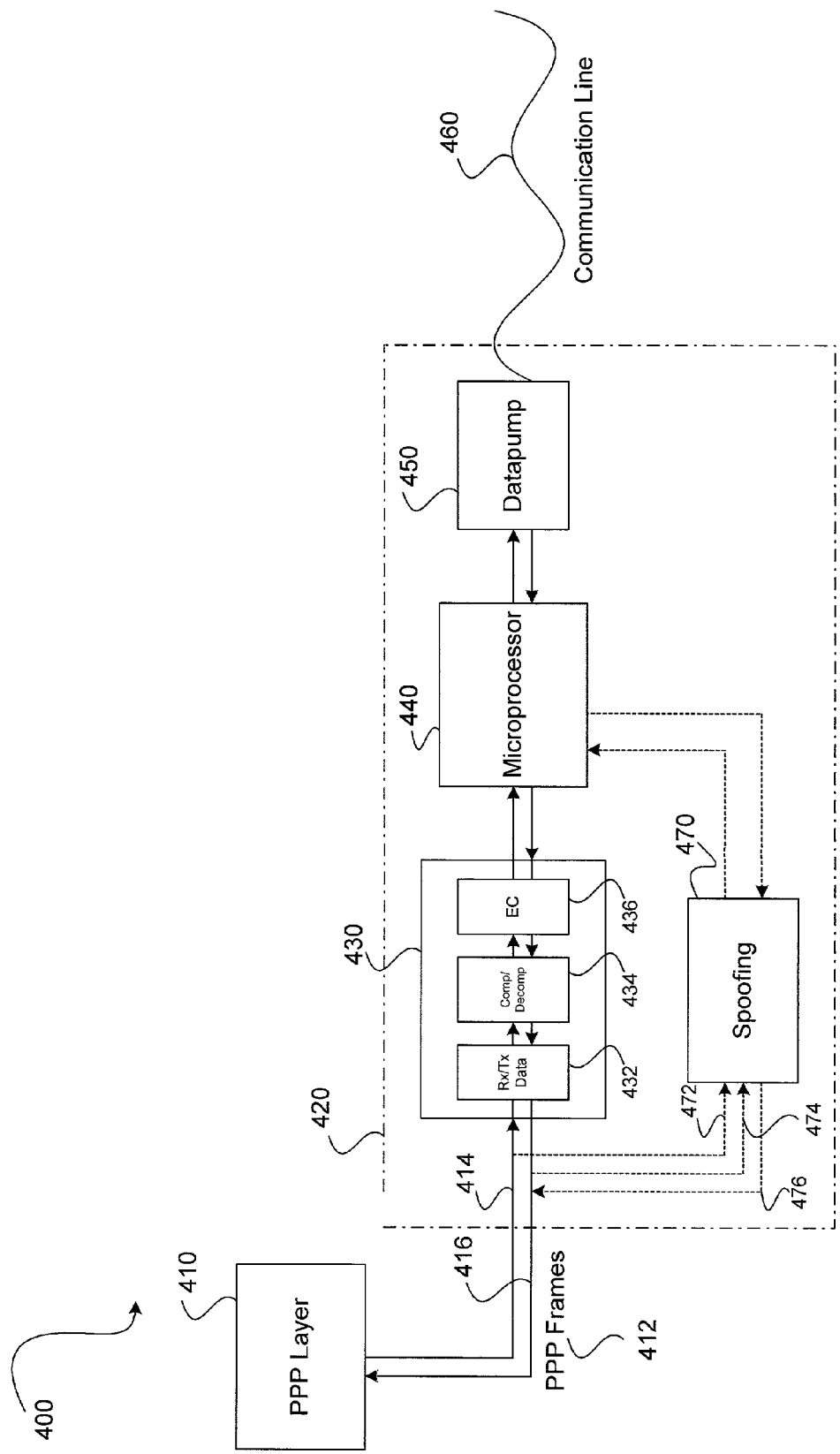
FIG. 4 is a block diagram of a communication system according to one embodiment of the present invention.

The modem system 300 also includes higher-layer protocols, such as PPP, running on top of ADPCM and DPCM data layers, such as V.42/V.42bis protocol. For the sake of simplicity, the higher-layer protocols may be denoted as APCM PPP layer 305 and DPCM PPP layer 303. FIG. 4 illustrates a communication system 400, including a PPP layer 410 running on top of data layer 430 of modem 420. As shown, modem 420 includes data layer 430 that is controlled by a controller or a microprocessor 440. The data layer 430 comprises a communication interface 432, including a receiver and transmitter, a compression/decompression module 434 and an error correction module 436. Under the control of the microprocessor 440, data receiver 432 receives PPP frames 412 from the PPP layer 410. The PPP frames 412 may then be compressed using various compression methods, such as V.42bis or MNP5. An error correction module 436, such as V.42 or MNP4, then packetizes the compressed PPP frames. The microprocessor 440 provides the packetized and compressed PPP frames to a datapump 450, acting as a communication interface, and for transmission to a remote modem (not shown) over a communication line 460. Similarly, packetized and compressed PPP frames received over the communication line 460 by the datapump 450 are provided to the microprocessor 440. The error correction module 436, which is under the control of the microprocessor 440, depacketizes the received PPP frames. The depacketized PPP frames are then decompressed using the decompression module 434. The received PPP frames are then transmitted by the data transmitter 432 to the PPP layer 410 for processing.

As shown, the communication system 400 also includes a spoofing module 470 under the control of the microprocessor 440. The spoofing module 470 is capable of monitoring PPP frames received from the PPP layer 410 on line 414 through line 472. The spoofing module 470 is further capable of monitoring PPP frames transmitted to the PPP layer 410 on line 416 through line 474. Also, the spoofing module 470 is capable of transmitting PPP frames to the PPP layer 410 via line 476 and through line 416, as further discussed below.

Turning back to FIG. 3, the APCM modem 304 may continuously monitor the line for a caller ID alert signal from the central office 306. Once the alert signal is detected, the APCM modem 304 confirms the alert signal for a predetermined period of time. After confirming the alert signal, the APCM modem 304 transmits a "D" tone, as explained above, to the central office 306 requesting that the caller ID data be transmitted to the APCM modem 304. At this point, the APCM modem 304 configures itself to receive the caller ID data. For example, the APCM modem 304 receiver may be configured for V.21 operation for receiving the caller ID data. The APCM modem 304 may further be configured to detect a "B" tone from the DPCM modem 302.

After transmitting the "D" tone, the APCM modem 304 may begin a multi-tasking operation, where the APCM modem 304 concurrently monitors the line for both the caller ID data and the "B" tone from the DPCM modem 302. Once the "B" tone is received, the APCM modem 304 confirms the "B" tone for a predetermined amount time, e.g., 10–20 milliseconds. At this point, to avoid a misinterpretation by the DPCM modem 302 that a loss of carrier has occurred, the APCM modem 304 transmits an "A" tone followed by a modem hold notification, to the DPCM modem 302. Next, the APCM modem 304 awaits a response from the DPCM modem. In the mean time, however, the APCM modem 304 may be receiving the caller ID data from the central office 306. In one scenario, the DPCM modem 302 may respond to the APCM modem notification with a modem on hold indication. The APCM modem 304 may then place the DPCM modem 302 on hold and transmit a flash signal to cease the incoming call.

Figure 5:
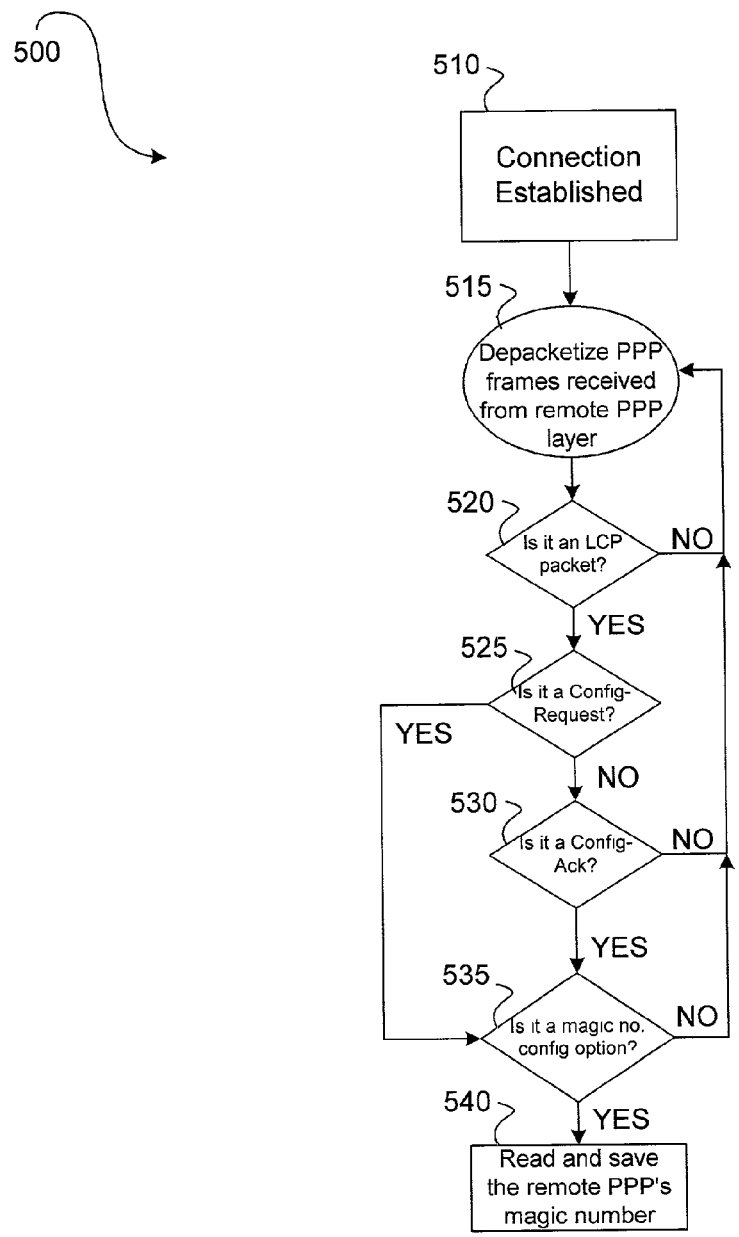
FIG. 5 is a flow diagram illustrating information gathering from a higher-level protocol according to one embodiment of the present invention.
Figure 6:
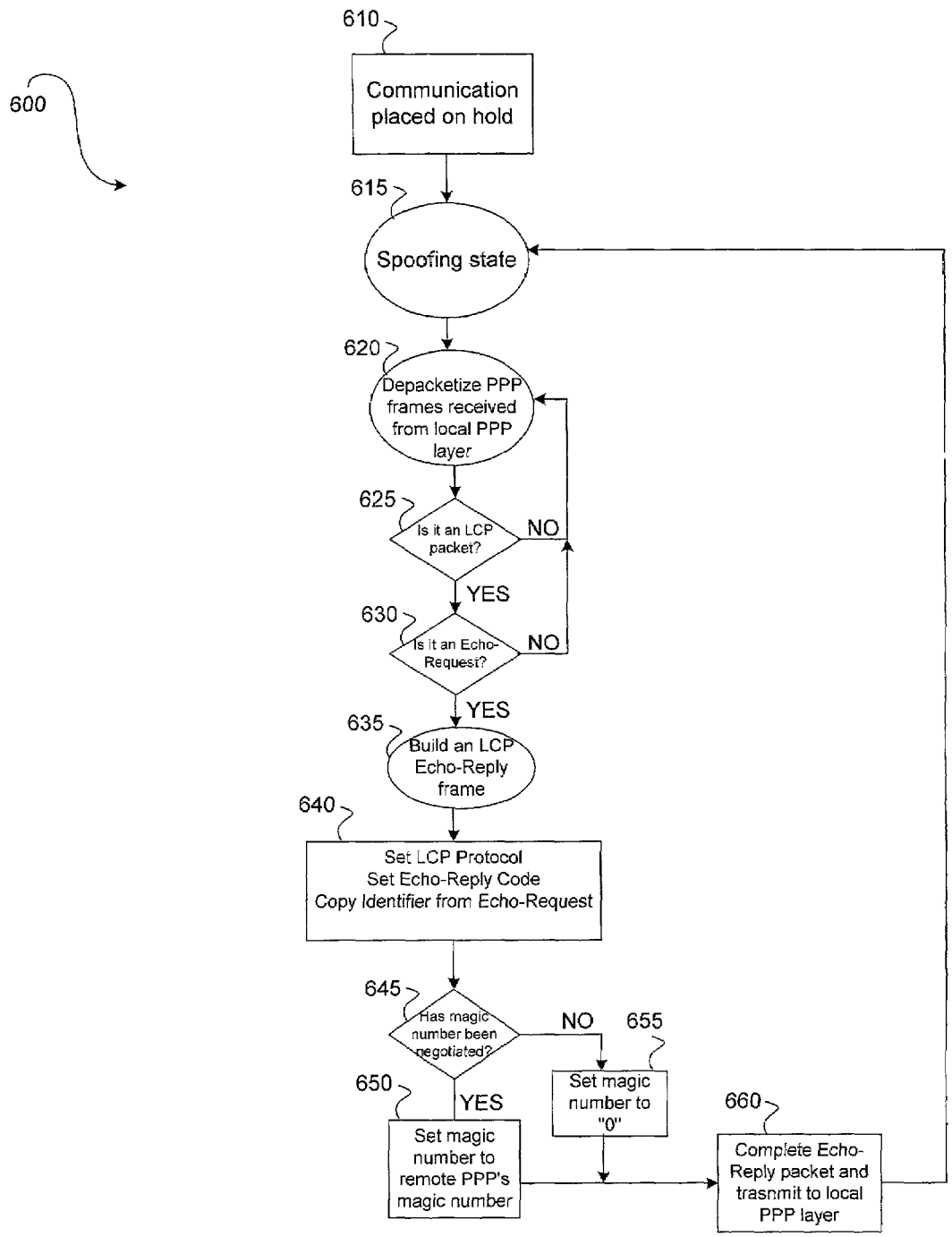
FIG. 6 is a flow diagram of spoofing according to one embodiment of the present invention.

After the communication between the APCM modem 304 and the DPCM modem 302 is placed on hold, however, the APCM PPP layer 305 and the DPCM PPP layer continue transmitting PPP frames unaware of the hold. Moreover, each PPP layer may transmit an LCP Echo-Request packet to the other in order to determine whether the communication link is functioning properly or is failing, or for other various reasons. As stated above, the LCP Echo-Request must be replied to by the receiving PPP layer. Failure to receive an LCP Echo-Reply may cause the requesting PPP layer to assume that the communication link has failed and as a result terminate the communication session. FIGS. 5 and 6 illustrate an embodiment of the present invention in which the requesting PPP layer's local modem is capable of remedying any problem by spoofing or creating a fake response to preserve the communication link during an interruption in communication, such as a temporary pause in communication, a hold state and the like.

FIG. 5 illustrates a flow diagram 500 of one embodiment of the present invention showing a method of gathering information from a higher-level protocol by a communication device for use in spoofing. As shown, a connection must first be established between the communication devices, for example the APCM modem 304 and the DPCM modem 302 of FIG. 3, in step 510.

After the connection has been established, the flow diagram 500 moves to step 515 where each modem may monitor the PPP frames received and being transmitted to its local PPP layer. For example, as shown in FIG. 4, a spoofing module 470 under the control of the microprocessor 440 may monitor the PPP frames 412 being transmitted to the PPP layer 410 by tapping into line 416 through line 474. As shown in FIG. 4, the line 474 monitors received data after depacketization by the EC module 436 and decompression by the decompression module 434. Referring to FIG. 3, spoofing module 324 may monitor the PPP frames received from the APCM PPP layer 305 and being transmitted to the DPCM PPP layer 303 through line 329. Similarly, spoofing module 344 may monitor the PPP frames received from the DPCM PPP layer 303 and being transmitted to the APCM PPP layer 305 through line 349.

Having the knowledge of the PPP frame format, as described above, the PPP frames can be depacketized in step 515. In step 520, the flow diagram 500 determines whether the PPP frame includes an LCP packet by comparing the protocol field against LCP protocol. If a match is not found, the flow diagram 500 moves back to state 515 to depacketize the next packet. However, if a match is found in state 520, the flow diagram 500 moves to state 525 to determine whether the LCP packet is a Configure-Request packet. As explained above and shown in FIG. 2c, the code field of the packet is compared against the Configure-Request code or "01". If a match is found, the flow diagram moves to state 535. However, if there is not a match, the flow diagram 500 moves to state 530 to determine whether the LCP packet is a Configure-Ack packet. As explained above and shown in FIG. 2d, the code field of the packet is compared against the Configure-Ack code or "02". If there is not a match, the flow diagram 500 moves back to state 515 to depacketize the next packet.

If the state 535 is reached, the flow diagram 500 determines whether the packet is a Configure Option Magic Number by comparing the type field of the packet with the Magic Number type or "05", as shown in FIG. 2f. If there is not a match, the flow diagram 500 moves back to state 515 to depacketize the next packet. If, however, there is a match, the flow diagram 500 reads the remote PPP layer's magic number from the locations shown in FIG. 2f and stores the magic number for future use, for example, by the spoofing module.

FIG. 6 is a flow diagram 600 of spoofing according to one embodiment of the present invention. As shown, state 610 is entered when the APCM modem 304 and the DPCM modem agree to place the communication on hold. At this point, the spoofing flow diagram 600 enters the spoofing state in order to generate a fake response to higher-level protocols to maintain the communication session as if the modems are not in a hold state. Accordingly, in state 615, each modem starts monitoring the received data from its local PPP layer. For example, as shown in FIG. 4, the spoofing module 470 starts monitoring the PPP frames being received from the PPP layer 410 on line 414 through line 472. Referring to FIG. 3, spoofing module 324 may also monitor the PPP frames received from the DPCM PPP layer 303 through line 328. Similarly, spoofing module 344 may monitor the PPP frames received from the APCM PPP layer 305 through line 348.

Having the knowledge of the PPP frame format, as described above, the PPP frames can be depacketized in step 620. In step 625, the spoofing flow diagram 600 determines whether the PPP frame includes an LCP packet by comparing the protocol field against LCP protocol. If a match is not found, the spoofing flow diagram 600 moves back to state 620 to depacketize the next packet. However, if a match is found in state 625, the spoofing flow diagram 600 moves to state 630 to determine whether the LCP packet is an Echo-Request packet. As explained above and shown in FIG. 2g, the code field of the packet is compared against the Echo-Request code or "09". If there is not a match, the spoofing flow diagram moves back to state 620 to depacketize the next packet.

If a match is found, the spoofing flow diagram 600 moves to state 635 to build an LCP Echo-Reply to spoof the local PPP layer or to fake a response, as if the response has been received from the remote PPP layer, so that the on-hold status would remain transparent to the local PPP layer. In one embodiment, the flow diagram 600 may not include the states 620–630. In other words, the spoofing state may transmit a signal, such as a tone or a frame, without receiving a request, knowing that such signal must be transmitted or is expected, for example, at predetermined intervals.

As shown, in state 640, the LCP Echo-Reply packet is built by setting the protocol field to the LCP protocol value, setting the code field to the Echo-Reply code or "10" (as shown in FIG. 2h) and setting the identifier field to the identifier value of the Echo-Request packet above.

At this stage, the spoofing flow diagram 600 moves to state 645 to determine whether a magic number has been negotiated. If a magic number has been negotiated and received from the remote PPP layer (see FIG. 5), the magic number field of the LCP packet is set to the remote PPP layer's magic number in state 650, so that the local PPP layer believes that the LCP-Reply packet has been received from the remote PPP layer. If a magic number has not been negotiated or received from the remote PPP layer, according to the PPP specification, the magic number field of the LCP Echo-Reply is set to "0" in state 655. At this point, the spoofing flow diagram moves to state 660 to complete the packet by entering other fields, including the length field, and forming an HDLC frame, as shown in FIG. 2a. Next, this fake LCP Echo-Reply packet is transmitted to the local PPP layer in response to the LCP Echo-Request and the spoofing flow diagram returns to state 620 to depacketize the next packet.

As shown in FIG. 4, the spoofing module 470 transmits the fake LCP Echo-Reply to the PPP layer 410 through line 476, which is in communication with line 416. Also, as shown in FIG. 3, the spoofing module 324 may transmit the fake LCP Echo-Reply to the DPCM PPP layer 303 through line 326. Similarly, the spoofing module 344 may transmit the fake LCP Echo-Reply to the APCM PPP layer 305 through line 326.

Various embodiments of the present invention may be implemented in software. When implemented in software, at least some elements of the present invention can be in the form of computer data, including, but not limited to, any bits of information, code, etc. The data may be arranged in group of bits or data segments and may be stored in a processor readable medium or transmitted by a data signal embodied in a carrier wave over a transmission medium or communication link. For example, bits of information in a frame, including a PPP frame or a fake LCP Echo-Reply packet, may form various data segments that can be transmitted by a data signal embodied in a carrier wave. The communication link may include, but is not limited to, a telephone line, a modem connection, an Internet connection, an ISDN connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

The present invention may be embodied in other specific forms without departing from its spirit or essential characteristics. The described embodiments are to be considered in all respects only as illustrative and not restrictive. To this end, modems, PPP and frames have been used for illustrative purposes and the present invention may be implemented using any communication device any higher-level protocol. For example, spoofing a protocol other than PPP may require transmitting any signal, such as a tone, etc. and not a frame similar to an HDLC frame of PPP. Accordingly, the scope of the invention is indicated by the appended claims rather than the foregoing description. All changes which come within the meaning and range of equivalency of the claims are to be embraced within their scope.

What is claimed is:

1. A method of spoofing for use by a first modem, wherein said first modem is in a modem communication with a second modem, wherein a first point-to-point protocol (PPP) layer is in a PPP communication with a second PPP layer via said modem communication, and wherein said PPP communication includes a link configuration packet, an echo request packet and an echo reply packet, said method comprising:

monitoring PPP data packets, including said link configuration packet, communicated by said second PPP layer to said first PPP layer via said modem communication;

obtaining a magic number from said link configuration packet by said first modem;

interrupting said PPP communication such that no PPP data packets are communicated between said second PPP layer and said first PPP layer via said modem communication;

detecting said echo request packet from said first PPP layer, destined for said second PPP layer, by said first modem after said interrupting;

creating said echo reply packet by said first modem in response to said detecting said echo request packet;

inserting said magic number by said first modem into said echo reply packet; and responding to said echo request packet by said first modem by transmitting said echo reply packet including said magic number to said first PPP layer.

2. The method of claim 1, wherein said interrupting includes placing said modem communication on hold.

3. The method of claim 1, wherein said responding prevents said first PPP layer from disconnecting said PPP communication.

4. The method of claim 1, wherein said link configuration packet is a Configure-Request packet.

5. The method of claim 1, wherein said link configuration packet is a Configure-Ack packet.

6. A first modem in a modem communication with a second modem, wherein a first point-to-point protocol (PPP) layer is in a PPP communication with a second PPP layer via said modem communication, and wherein said PPP communication includes a link configuration packet, an echo request packet and an echo reply packet, said first modem comprising:

a controller;

a first PPP layer interface controlled by said controller, wherein said first PPP layer interface interfaces with said first PPP layer;

a second communication PPP layer interface controlled by said controller, wherein said second PPP layer interface interfaces with said second PPP layer via said modem communication; and a spoofing module controlled by said controller;

wherein said spoofing module monitors said second PPP layer interface for PPP data packets, including said link configuration packet, communicated by said second PPP layer to said first PPP layer via said modem communication, and wherein said spoofing module obtains a magic number from said link configuration packet, and wherein after an interruption in said PPP communication that causes no PPP data packets to be communicated between said second PPP layer and said first PPP layer via said modem communication, said controller detects said echo request packet from said first PPP layer destined for said second PPP layer, and wherein said controller creates said echo reply packet in response to said echo request packet, inserts said magic number into said echo reply packet, and responds to said echo request packet by transmitting said echo reply packet including said manic number to said first PPP layer.

7. The first modem of claim 6, wherein said interruption places said modem communication on hold.

8. The system first modem of claim 6, wherein said link configuration packet is a Configure-Request packet.

9. The system first modem of claim 6, wherein said link configuration packet is a Configure-Ack packet.

10. The first modem of claim 6, wherein transmission of said echo reply packet by said controller prevents said first PPP layer from disconnecting said PPP communication.

11. A method of spoofing for use by a first modem, wherein said first modem is in a modem communication with a second modem, wherein a first protocol layer is in a protocol communication with a second protocol layer via said modem communication, and wherein said protocol communication includes a first packet, a second packet and a third packet, said method comprising:

monitoring protocol data packets, including said first packet, communicated by said second protocol layer to said first protocol layer via said modem communication;

obtaining a number from said first packet by said first modem;

interrupting said protocol communication such that no protocol data packets are communicated between said second protocol layer and said first protocol layer via said modem communication;

detecting said second packet from said first protocol layer, destined for said second protocol layer, by said first modem after said interrupting;

creating said third packet by said first modem in response to said detecting said second packet;

inserting said number by said first modem into said third packet; and responding to said second packet by said first modem by transmitting said third packet including said number to said first protocol layer.

12. The method of claim 11, wherein said interrupting includes placing said modem communication on hold.

13. The method of claim 11, wherein said protocol communication is a point-to-point protocol (PPP) communication.

14. The method of claim 13, wherein said responding prevents said first PPP layer from disconnecting said PPP communication.

15. The method of claim 13, wherein said first packet is a Configure-Request packet.

16. The method of claim 13, wherein said second packet is an echo request packet.

17. The method of claim 13, wherein said third packet is an echo reply packet.

18. The method of claim 13, wherein said number is a magic number.

19. A first modem in a modem communication with a second modem, wherein a first protocol layer is in a protocol communication with a second protocol layer via said modem communication, and wherein said protocol communication includes a first packet, a second packet and a third packet, said first modem comprising:

a controller;

a first protocol layer interface controlled by said controller, wherein said first protocol layer interface interfaces with said first protocol layer;

a second protocol layer interface controlled by said controller, wherein said second protocol layer interface interfaces with said second protocol layer via said modem communication; and a spoofing module controlled by said controller;

wherein said spoofing module monitors said second protocol layer interface for protocol data packets, including said first packet, communicated by said second protocol layer to said first protocol layer via said modem communication, and wherein said spoofing module obtains a number from said first packet, and wherein after an interruption in said protocol communication that causes no protocol data packets to be communicated between said second protocol layer and said first protocol layer via said modem communication, said controller detects said second packet from said first protocol layer destined for said second protocol layer, and wherein said controller creates said third packet in response to said second packet, inserts said number into said third packet, and responds to said second packet by transmitting said third packet including said number to said first protocol layer.

20. The first modem of claim 19, wherein said interruption places said modem communication on hold.

21. The first modem of claim 19, wherein said protocol communication is a point-to-point protocol (PPP) communication.

22. The first modem of claim 21, wherein transmission of said third packet by said controller prevents said first PPP layer from disconnecting said PPP communication.

23. The first modem of claim 21, wherein said first packet is a Configure-Request packet.

24. The first modem of claim 21, wherein said second packet is an echo request packet.

25. The first modem of claim 21, wherein said third packet is an echo reply packet.

26. The first modem of claim 21, wherein said number is a magic number.

* * * * *

UNITED STATES PATENT AND TRADEMARK OFFICE
CERTIFICATE OF CORRECTION

PATENT NO. : 6,993,010 B1
APPLICATION NO. : 09/611923
DATED : January 31, 2003
INVENTOR(S) : Peshkin, Joel D.

It is certified that error appears in the above-identified patent and that said Letters Patent is hereby corrected as shown below:

Column 15,
Line 21, "manic" should be -- magic --.

Signed and Sealed this

Twenty-seventh Day of June, 2006

JON W. DUDAS
*Director of the United States Patent and Trademark Office*